United States Patent
Tanaka (10) Patent No.: US 11,528,436 B2
(45) Date of Patent: Dec. 13, 2022

(54) IMAGING APPARATUS AND METHOD FOR CONTROLLING IMAGING APPARATUS

(71) Applicant: CANON KABUSHIKI KAISHA, Tokyo (JP)

(72) Inventor: Masanori Tanaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/874,559

(22) Filed: May 14, 2020

(65) Prior Publication Data

US 2020/0374476 A1 Nov. 26, 2020

(30) Foreign Application Priority Data

May 20, 2019 (JP) .............................. JP2019-094671

(51) Int. Cl.
*H04N 5/374* (2011.01)
*H04N 9/04* (2006.01)
*H04N 5/378* (2011.01)
*H04N 5/369* (2011.01)

(52) U.S. Cl.
CPC ............ *H04N 5/374* (2013.01); *H04N 5/378* (2013.01); *H04N 5/379* (2018.08); *H04N 9/0455* (2018.08)

(58) Field of Classification Search
None
See application file for complete search history.

(56) References Cited

U.S. PATENT DOCUMENTS

| 2015/0085077 A1* | 3/2015 | Kim | H04N 13/211 |
| | | | 348/46 |
| 2015/0281614 A1* | 10/2015 | Yoshida | H04N 5/3745 |
| | | | 348/308 |
| 2017/0272678 A1* | 9/2017 | Sakakibara | H03K 5/2481 |
| 2018/0013412 A1* | 1/2018 | Kikuchi | H03K 5/2481 |
| 2018/0270438 A1* | 9/2018 | Niwa | H01L 27/14636 |
| 2019/0394414 A1* | 12/2019 | Kawazu | H04N 5/378 |
| 2020/0106975 A1* | 4/2020 | Oike | H04N 5/374 |
| 2020/0382735 A1* | 12/2020 | Tagawa | H01L 27/14612 |
| 2020/0400819 A1* | 12/2020 | Yin | G01S 7/4861 |
| 2021/0051285 A1* | 2/2021 | Sato | H01L 27/14636 |

FOREIGN PATENT DOCUMENTS

| JP | 2001-223566 A | 8/2001 |
| WO | 2016/136448 A1 | 9/2016 |

OTHER PUBLICATIONS

Title: Transistor Web: https://web.archive.org/web/20120307002554/ https://en.wikipedia.org/wiki/Transistor Date: Mar. 12, 2012 (Year: 2012).*

* cited by examiner

*Primary Examiner* — Twyler L Haskins
*Assistant Examiner* — Wesley J Chiu
(74) *Attorney, Agent, or Firm* — Canon U.S.A., Inc. IP Division

(57) ABSTRACT

An imaging apparatus includes a first photoelectric conversion unit configured to convert light into charge, a second photoelectric conversion unit configured to convert light into charge, and a comparison unit. The comparison unit includes a first transistor and a second transistor. The first transistor receives a signal that is based on the charge converted by the first photoelectric conversion unit. The second transistor receives a signal that is based on the charge converted by the second photoelectric conversion unit.

6 Claims, 7 Drawing Sheets

IMAGING APPARATUS AND METHOD FOR CONTROLLING IMAGING APPARATUS

BACKGROUND

Field

One disclosed aspect of the embodiments relates to an imaging apparatus and a method for controlling the imaging apparatus.

Description of the Related Art

In Japanese Patent Application Laid-Open No. 2001-223566, when one of transistors included in a pixel circuit also serves as an input transistor of a differential input circuit used in an analog-digital conversion circuit, the analog-digital conversion circuit can immediately perform analog-digital conversion on a photoelectrically-converted signal.

In an imaging apparatus discussed in International Publication No. WO 2016/136448, a semiconductor substrate stacking technique is used to provide a part of a readout circuit in a substrate of a lower layer. This makes it possible to realize one comparison circuit per one pixel, and to read out in parallel all of pixels without waiting until the readout circuit becomes available.

In Japanese Patent Application Laid-Open No. 2001-223566, the plurality of pixels shares the other input transistor of the differential input circuit. Thus, a length of the wiring is increased, a long settlement time is necessary, and readout speed is accordingly decreased. Further, in International Publication No. WO 2016/136448, a circuit scale per one pixel is large in a substrate of an upper layer. As a result, it is difficult to secure an area of a photodiode, and to increase the number of pixels.

SUMMARY

According to an aspect of the disclosure, an imaging apparatus includes a first photoelectric conversion unit configured to convert light into charge, a second photoelectric conversion unit configured to convert light into charge, and a comparison unit. The comparison unit includes a first transistor and a second transistor. The first transistor receives a signal that is based on the charge converted by the first photoelectric conversion unit. The second transistor receives a signal that is based on the charge converted by the second photoelectric conversion unit.

Further features of the disclosure will become apparent from the following description of exemplary embodiments with reference to the attached drawings.

DESCRIPTION OF THE EMBODIMENTS

Figure 1:
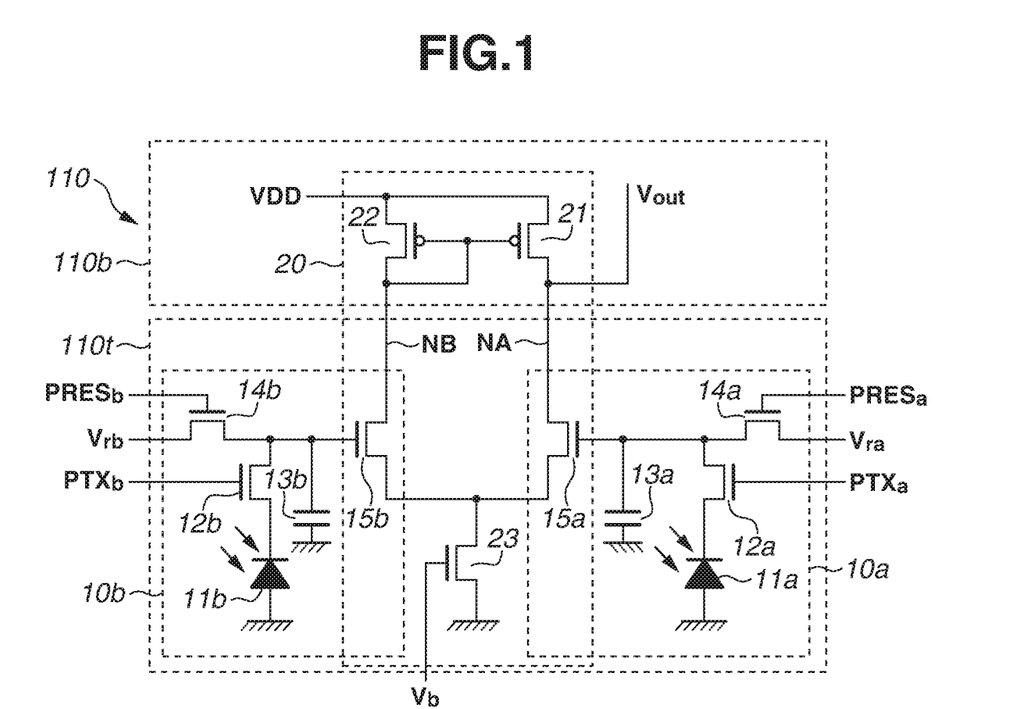
FIG. 1 is a circuit diagram illustrating a configuration example of a pixel circuit.

FIG. 1 is a circuit diagram illustrating a configuration example of a pixel circuit 110 according to a first exemplary embodiment. The pixel circuit 110 includes a pixel 10a, a pixel 10b, and a comparison unit 20. The pixel 10a and the pixel 10b share the comparison unit 20.

The pixel 10a includes a photodiode (hereinafter, referred to as PD) 11a, a transfer switch 12a, a floating diffusion (hereinafter, referred to as FD) 13a, a reset switch 14a, and an input transistor 15a.

The PD 11a is a photoelectric conversion unit that converts incident light into charge. The transfer switch 12a transfers the charge converted by the PD 11a to the FD 13a in response to a transfer pulse PTXa. The FD 13a is a capacitance including a parasitic capacitance of the transfer switch 12a, the reset switch 14a, and the input transistor 15a and a parasitic capacitance between wirings. The FD 13a accumulates the charge and converts the accumulated charge into a voltage. The reset switch 14a transfers a comparison signal Vra to the FD 13a in response to a reset pulse PRESa. The input transistor 15a is shared by the pixel 10a and the comparison unit 20, and outputs a voltage corresponding to the voltage (charge amount) of the FD 13a.

The pixel 10b includes a PD 11b, a transfer switch 12b, an FD 13b, a reset switch 14b, and an input transistor 15b.

The PD 11b is a photoelectric conversion unit that converts incident light into charge. The transfer switch 12b transfers the charge converted by the PD 11b to the FD 13b in response to a transfer pulse PTXb. The FD 13b is a capacitance including a parasitic capacitance of the transfer switch 12b, the reset switch 14b, and the input transistor 15b and a parasitic capacitance between wirings. The FD 13b accumulates the charge and converts the accumulated charge into a voltage. The reset switch 14b transfers a comparison signal Vrb to the FD 13b in response to a reset pulse PRESb. The input transistor 15b is shared by the pixel 10b and the comparison unit 20, and outputs a voltage corresponding to the voltage (charge amount) of the FD 13b.

The FD 13a and FD 13b may be configured by one FD 13, and the pixel 10a and the pixel 10b may share one FD 13.

The comparison unit 20 is a differential input circuit, and includes transistors 21 and 22 configuring a current mirror, the input transistors 15a and 15b configuring a differential pair, and a current control transistor 23.

The transistors 21 and 22 are p-channel metal-oxide semiconductor (PMOS) field effect transistors, and each have a source connected to a power line VDD. A gate of the transistor 21 is connected to a drain and a gate of the transistor 22. As a result, the transistors 21 and 22 configure the current mirror. A drain of the transistor 21 is connected as an output terminal to a logic control circuit 30 in FIG. 2.

The input transistors 15a and 15b configure the differential pair, and drains of the input transistors 15a and 15b are respectively connected to the drains of the transistors 21 and 22. Further, gates of the input transistors 15a and 15b are respectively connected to the FDs 13a and 13b.

The current control transistor 23 controls a current amount that is based on a current control voltage Vb input to a gate of the current control transistor 23. Further, the current control transistor 23 has a source connected to a ground line GND, and a drain connected to sources of the input transistors 15a and 15b.

A node NA is a node at a mutual connection point between the drain of the input transistor 15a and the drain of the transistor 21. A node NB is a node at a mutual connection point between the drain of the input transistor 15b and the drain of the transistor 22. The comparison unit 20 outputs an output signal Vout from the node NA to the logic control circuit 30 in FIG. 2 that is based on the voltages input to the input transistors 15a and 15b.

The pixel circuit 110 is divided into a pixel circuit 110t and a pixel circuit 110b. The pixel circuit 110t is formed on a first substrate 100 in FIG. 3. The pixel circuit 110b is formed on a second substrate 200 in FIG. 3. The pixel circuit 110t includes the pixel 10a, the pixel 10b and the current control transistor 23 that is a part of the comparison unit 20. The pixel circuit 110b includes the transistors 21 and 22 that are the other part of the comparison unit 20. The current control transistor 23 may be formed on the second substrate 200 in place of the first substrate 100.

The pixel circuit 110t includes, in the first substrate 100, the suppressed total number of seven transistors. In a case where the current control transistor 23 is formed on the second substrate 200, the total number of transistors is six in the pixel circuit 110t, and three transistors corresponds to one pixel.

The transfer switch 12a supplies a signal that is based on the charge converted by the PD 11a to the gate of the input transistor 15a. The reset switch 14a supplies the comparison signal Vra to the gate of the input transistor 15a. The transfer switch 12b supplies a signal that is based on the charge converted by the PD 11b to the gate of the input transistor 15b. The reset switch 14b supplies the comparison signal Vrb to the gate of the input transistor 15b.

The gate of the input transistor 15a can receive the signal that is based on the charge converted by the PD 11a or the comparison signal Vra. The gate of the input transistor 15b can receive the signal that is based on the charge converted by the PD 11b or the comparison signal Vrb.

The comparison unit 20 alternatively performs comparison between the signal of the PD 11a and the comparison signal Vrb and comparison between the signal of the PD 11b and the comparison signal Vra. When the transfer switch 12a is turned on and the reset switch 14a is turned off, the signal of the PD 11a is transferred to the FD 13a. When the transfer switch 12b is turned off and the reset switch 14b is turned on, the comparison signal Vrb is transferred to the FD 13b. Further, when the transfer switch 12b is turned on and the reset switch 14b is turned off, the signal of the PD 11b is transferred to the FD 13b. When the transfer switch 12a is turned off and the reset switch 14a is turned on, the comparison signal Vra is transferred to the FD 13a.

In a case where the input signal of the input transistor 15b is larger than the input signal of the input transistor 15a, the output signal Vout of the comparison unit 20 becomes a high level. In a case where the input signal of the input transistor 15a is larger than the input signal of the input transistor 15b, the output signal Vout of the comparison unit 20 becomes a low level.

Figure 2:
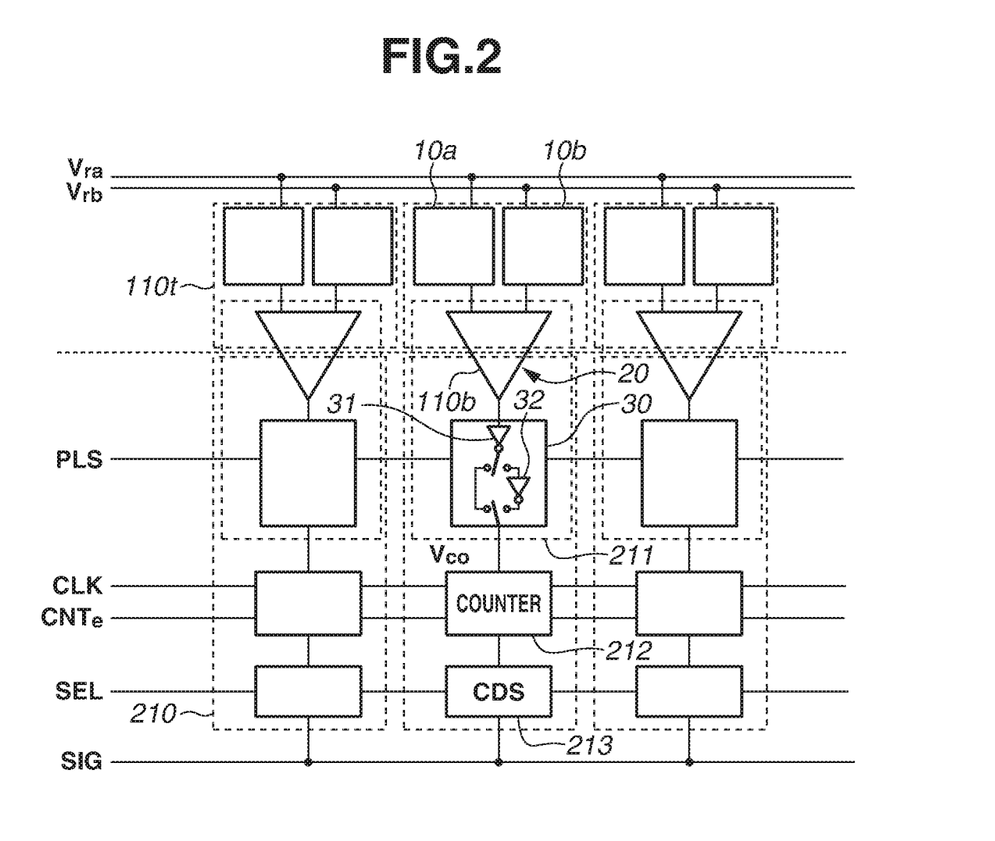
FIG. 2 is a circuit diagram illustrating a configuration example of a readout circuit.

FIG. 2 is a block diagram illustrating a configuration example of a readout circuit 210. Each of a plurality of pixel circuits 110 includes a pixel circuit 110t and a pixel circuit 110b. As described above, the pixel circuit 110t includes the pixel 10a, the pixel 10b, and a part of the comparison unit 20. The pixel circuit 110b includes the other part of the comparison unit 20. The comparison signals Vra and Vrb are supplied to a plurality of the pixel circuits 110t.

Each of a plurality of readout circuits 210 is connected to the pixel circuit 110. Each of the plurality of readout circuits 210 includes the pixel circuit 110b, the logic control circuit 30, a counter circuit 212, and a correlated double sampling (CDS) circuit 213, and outputs a pixel signal SIG.

The logic control circuit 30 is a logic control unit, includes inverters 31 and 32, amplifies the output signal of the comparison unit 20, and outputs an inverted signal or a non-inverted signal of the output signal of the comparison unit 20, as an output signal Vco, to the counter circuit 212. The logic control circuit 30 switches between inverting the output signal Vco or not, based on a control signal PLSS.

In a case where a control signal PLS is at the low level, the logic control circuit 30 outputs the output signal of the comparison unit 20 as the output signal Vco to the counter circuit 212 through one inverter 31. In this case, the output signal Vco is the inverted signal of the output signal of the comparison unit 20.

Further, in a case where the control signal PLS is at the high level, the logic control circuit 30 outputs the output signal of the comparison unit 20 as the output signal Vco to the counter circuit 212 through two inverters 31 and 32. In this case, the output signal Vco is the non-inverted signal of the output signal of the comparison unit 20. Each of the plurality of comparison circuits 211 includes the logic control circuit 30 and the comparison unit 20, and outputs the output signal Vco to the corresponding counter circuit 212.

The counter circuit 212 receives a clock signal CLK and a control pulse CNTe. In a case where the control pulse CNTe is at the high level, the counter circuit 212 counts up or counts down of a count value based on the clock signal CLK. Further, the counter circuit 212 stops counting of the count value based on the output signal Vco. The count value corresponds to a value obtained by converting the signal of the PD 11a or 11b from the analog signal to the digital signal. The comparison unit 20, the logic control circuit 30, and the counter circuit 212 correspond to an analog-digital conversion unit that converts the signal of the PD 11a or 11b from the analog signal to the digital signal.

The analog-digital conversion unit sequentially outputs an N signal based on reset cancellation of the pixel 10a or 10b and an S signal that is based on photoelectric conversion of the pixel 10a or 10b. The details thereof are described below with reference to FIG. 4. The CDS circuit 213 is a difference output unit, and outputs a difference between the S signal and the N signal as the pixel signal SIG that is based on a control signal SEL.

Figure 3:
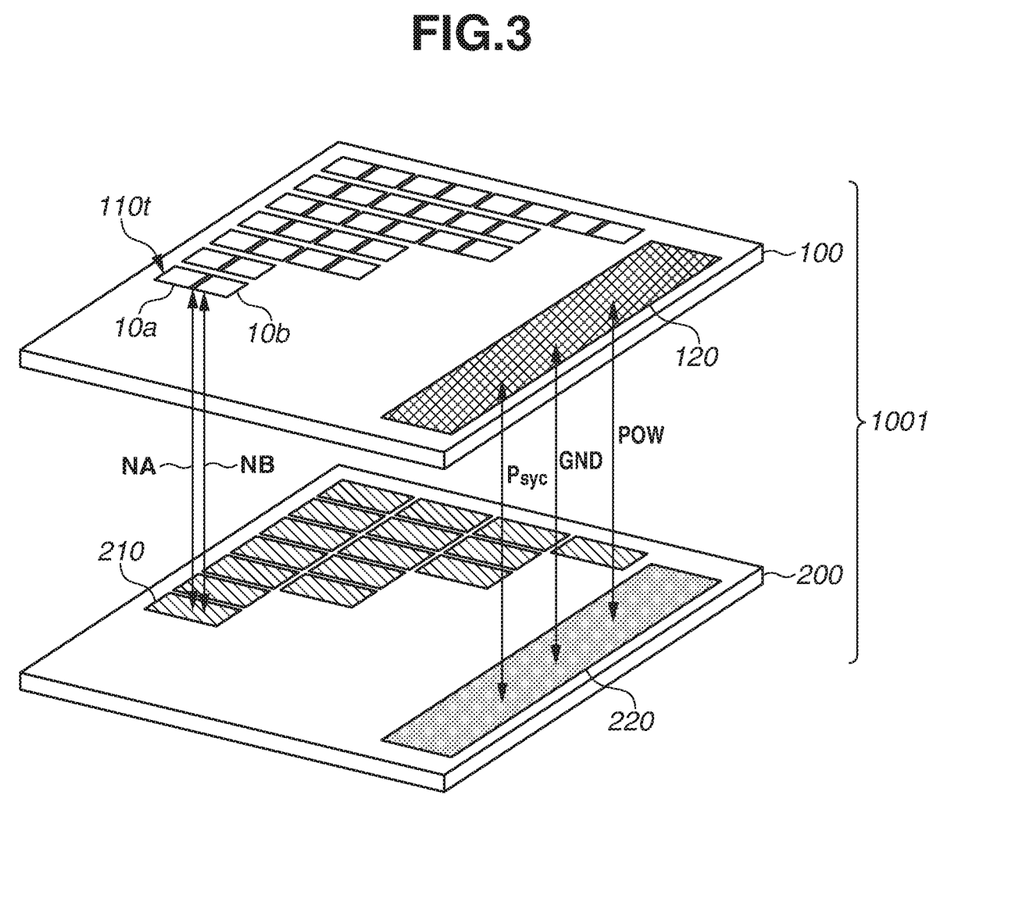
FIG. 3 is a perspective view illustrating a structure example of an imaging device.

FIG. 3 is a perspective view illustrating a structure example of an imaging device 1001. The imaging device 1001 includes a stacked layer structure of the first substrate 100 and the second substrate 200. The first substrate 100 includes the plurality of pixel circuits 110t arranged in a two-dimensional matrix, and a pixel control circuit 120. Each of the plurality of pixel circuits 110t includes the pixels 10a and 10b. The pixel control circuit 120 generates the transfer pulses PTXa and PTXb, the reset pulses PRESa and PRESb, the comparison signals Vra and Vrb, and the current control voltage Vb in FIG. 1, and controls the plurality of pixel circuits 110t.

The second substrate 200 includes a plurality of readout circuits 210 arranged in a two-dimensional matrix, and a readout control circuit 220. The plurality of readout circuits 210 are arranged corresponding to the respective pixel circuits 110t. The readout control circuit 220 generates the control signal PLS, the clock signal CLK, the control pulse CNTe, and the control signal SEL, and controls the readout circuits 210.

The pixel circuits 110t on the first substrate 100 are metallically joined with and electrically connected to the respective pixel circuits 110b on the second substrate 200 at the nodes NA and NB. The metallic joining is, for example, copper-copper (Cu—Cu) connection or through-silicon via (TSV) connection. Further, the readout control circuit 220 is electrically connected to the pixel control circuit 120 through a power line POW, a ground line GND, and a synchronous signal line Psyc.

As described above, in the imaging device 1001, the number of transistors per two pixels is suppressed to seven, which makes it possible to increase areas of the PDs 11a and 11b, and to increase the number of pixels. In a case where the current control transistor 23 is formed on the second substrate 200, the number of transistors per two pixels can be suppressed to six, which makes it possible to further increase the areas of the PDs 11a and 11b.

Figure 4:
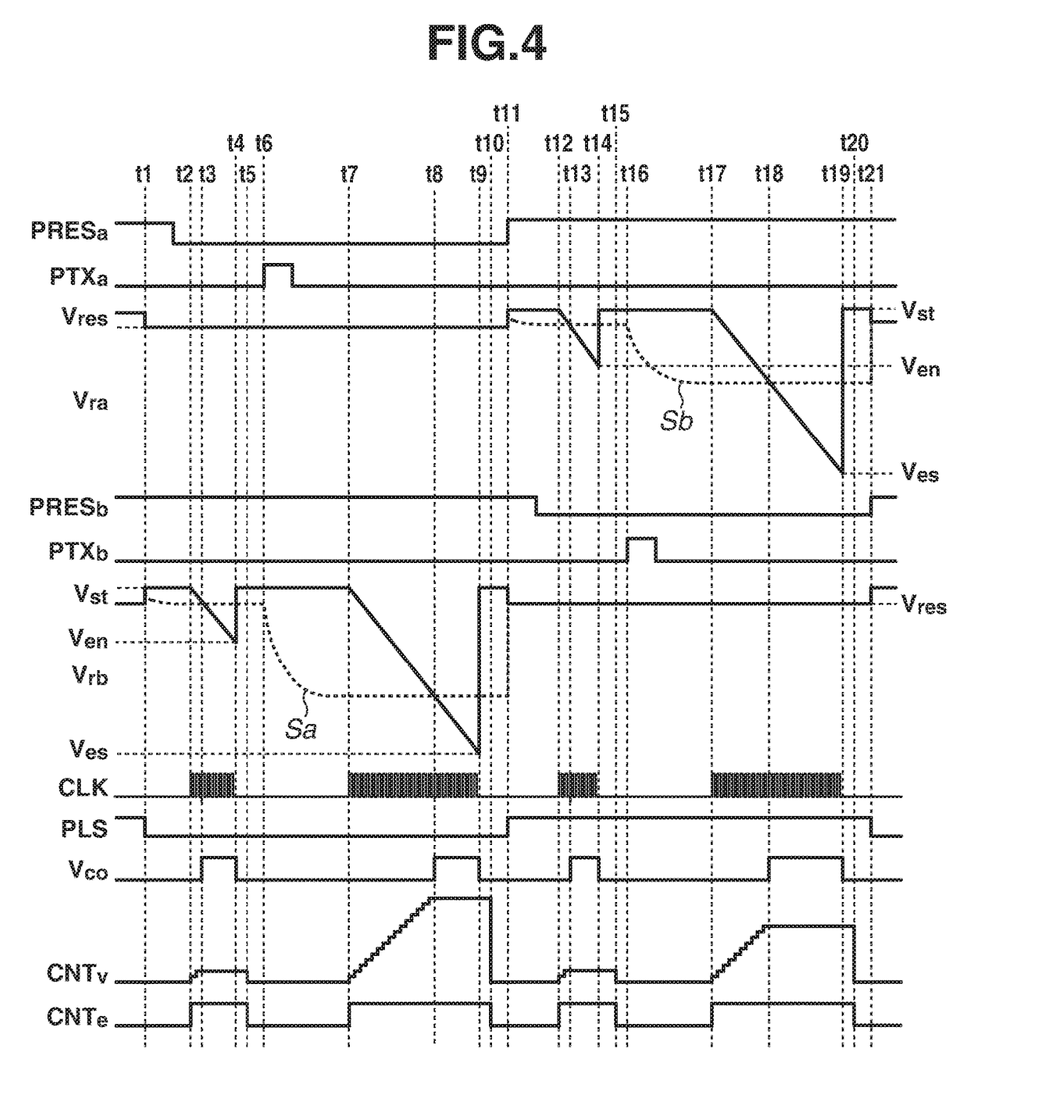
FIG. 4 is a timing chart illustrating readout operation.

FIG. 4 is a timing chart illustrating a method of controlling the imaging device 1001. Times t1 to t10 correspond to a signal readout period of the pixel 10a. Times t11 to t20 correspond to a signal readout period of the pixel 10b.

At times t1 to t11, the transfer pulse PTXb is at the low level, the reset pulse PRESb is at the high level, and the control signal PLS is at the low level. In a case where the transfer pulse PTXb is at the low level, the transfer switch 12b electrically disconnects the PD 11b from the FD 13b. In a case where the reset pulse PRESb is at the high level, the reset switch 14b supplies the comparison signal Vrb to the FD 13b. In a case where the control signal PLS is at the low level, the logic control circuit 30 outputs the output signal Vout of the comparison unit 20 as the output signal Vco to the counter circuit 212 through the inverter 31. The output signal Vco is the inverted signal of the output signal Vout of the comparison unit 20.

At time t1, the reset pulse PRESa is at the high level, and the pixel control circuit 120 outputs a reset level Vres as the comparison signal Vra. In a case where the reset pulse PRESa is at the high level, the reset switch 14a resets the FD 13a to the reset level Vres.

Then, the reset pulse PRESa becomes the low level, and the reset switch 14a cancels the reset of the FD 13a. The input transistor 15a shifts to a voltage state and a current state corresponding to the signal Sa based on reset cancelation of the FD 13a, and the reset level is reflected on the nodes NA and NB over a settlement time. At this time, the nodes NA and NB are not shared with the other pixel circuit 110. Therefore, wiring capacities of the nodes NA and NB are reduced, and signal change can be accelerated. As a result, the above-described settlement time is reduced, and high-speed readout can be performed.

At times t1 to t2, the pixel control circuit 120 outputs a start level Vst as the comparison signal Vrb. The start level Vst is larger than the reset level Vres. The comparison unit 20 compares the signal Sa of the FD 13a with the start level Vst of the FD 13b. The comparison unit 20 outputs the high-level output signal Vout (FIG. 1) because the start level Vst is larger than the signal Sa. The logic control circuit 30 inverts and amplifies the high-level output signal Vout by the inverter 31, and outputs the low-level output signal Vco.

At times t2 to t4, the pixel control circuit 120 reduces the comparison signal Vrb from the start level Vst to an end level Ven at constant speed. Further, at time t2, the readout control circuit 220 sets the control pulse CNTe to the high level, and starts supplying the clock signal CLK. When the control pulse CNTe becomes the high level, the counter circuit 212 starts counting the count value CNTv based on the clock signal CLK.

At time t3, the comparison signal Vrb becomes smaller than the signal Sa, and the comparison unit 20 then outputs the low-level output signal Vout (FIG. 1). The logic control circuit 30 inverts and amplifies the low-level output signal Vout by the inverter 31, and outputs the high-level output signal Vco. When the output signal Vco becomes the high level, the counter circuit 212 ends the counting operation of the count value CNTv. The count value CNTv is a value obtained by converting the signal Sa based on reset cancelation of the FD 13a from the analog signal to the digital signal.

At time t4, the comparison signal Vrb becomes the end level Ven, and the pixel control circuit 120 then resets the comparison signal Vrb to the start level Vst, and stops supplying the clock signal CLK. Then, the output signal Vco returns to the low level.

At time t5, the readout control circuit 220 sets the control pulse CNTe to the low level. When the control pulse CNTe becomes the low level, the counter circuit 212 outputs the count value CNTv to the CDS circuit 213, and then resets the count value CNTv. The CDS circuit 213 holds the count value CNTv output from the counter circuit 212 as a digital value Dan of the N signal.

At time t6, the pixel control circuit 120 sets the transfer pulse PTXa to the high level. Then, the transfer switch 12a transfers the charge converted by the PD 11a, to the FD 13a. Then, the pixel control circuit 120 sets the transfer pulse PTXa to the low level, and the transfer switch 12a ends transfer of the charge. The FD 13a holds the signal Sa that is based on the photoelectric conversion of the PD 11a.

At times t7 to t9, the pixel control circuit 120 reduces comparison signal Vrb from the start level Vst to an end level Ves at constant speed. Further, at time t7, the readout control circuit 220 sets the control pulse CNTe to the high level, and starts supplying the clock signal CLK. When the control pulse CNTe becomes the high level, the counter circuit 212 starts counting the count value CNTv based on the clock signal CLK.

At time t8, the comparison signal Vrb becomes smaller than the signal Sa, and the comparison unit 20 then outputs the low-level output signal Vout (FIG. 1). The logic control circuit 30 inverts and amplifies the low-level output signal Vout by the inverter 31, and outputs the high-level output signal Vco. When the output signal Vco becomes the high level, the counter circuit 212 ends the counting operation of the count value CNTv. The count value CNTv is a value obtained by converting the signal Sa that is based on the photoelectric conversion of the PD 11a from the analog signal to the digital signal.

At time t9, the comparison signal Vrb becomes the end level Ves, and the pixel control circuit 120 then resets the comparison signal Vrb to the start level Vst, and stops supplying the clock signal CLK. Then, the output signal Vco returns to the low level.

At time t10, the readout control circuit 220 sets the control pulse CNTe to the low level. When the control pulse CNTe becomes the low level, the counter circuit 212 outputs the count value CNTv to the CDS circuit 213, and then resets the count value CNTv. The CDS circuit 213 holds the count value CNTv output from the counter circuit 212 as a digital value Das of the S signal. Further, the CDS circuit 213 outputs a difference between the digital value Das of the S signal and the digital value Dan of the N signal as the pixel signal SIG of the pixel 10a, based on the control signal SEL.

At times t11 to t21, the transfer pulse PTXa is at the low level, the reset pulse PRESa is at the high level, and the control signal PLS is at the high level. In a case where the transfer pulse PTXa is at the low level, the transfer switch 12a electrically disconnects the PD 11a from the FD 13a. In a case where the reset pulse PRESa is at the high level, the reset switch 14a supplies the comparison signal Vra to the FD 13a. In a case where the control signal PLS is at the high level, the logic control circuit 30 outputs the output signal Vout of the comparison unit 20 as the output signal Vco to the counter circuit 212 through the inverters 31 and 32. The output signal Vco is the non-inverted signal of the output signal Vout of the comparison unit 20.

At time t11, the reset pulse PRESb is at the high level, and the pixel control circuit 120 outputs the reset level Vres as the comparison signal Vrb. In a case where the reset pulse PRESb is at the high level, the reset switch 14b resets the FD 13b to the reset level Vres.

Then, the reset pulse PRESb becomes the low level, and the reset switch 14b cancels the reset of the FD 13b. The input transistor 15b shifts to a voltage state and a current state corresponding to the signal Sb based on reset cancelation of the FD 13b, and the reset level is reflected on the nodes NA and NB over a settlement time.

At times t11 to t12, the pixel control circuit 120 outputs the start level Vst as the comparison signal Vra. The comparison unit 20 compares the signal Sb of the FD 13b with the start level Vst of the FD 13a. Since the start level Vst is larger than the signal Sb, the comparison unit 20 outputs the low-level output signal Vout (FIG. 1). The logic control circuit 30 normally amplifies the low-level output signal Vout by the inverters 31 and 32, and outputs the low-level output signal Vco.

At times t12 to t14, the pixel control circuit 120 reduces the comparison signal Vra from the start level Vst to the end level Ven at constant speed. Further, at time t12, the readout control circuit 220 sets the control pulse CNTe to the high level, and starts supplying the clock signal CLK. When the control pulse CNTe becomes the high level, the counter circuit 212 starts counting the count value CNTv based on the clock signal CLK.

At time t13, the comparison signal Vra becomes smaller than the signal Sb, and the comparison unit 20 then outputs the high-level output signal Vout (FIG. 1). The logic control circuit 30 normally amplifies the high-level output signal Vout by the inverters 31 and 32, and outputs the high-level output signal Vco. When the output signal Vco becomes the high level, the counter circuit 212 ends the counting operation of the count value CNTv. The count value CNTv is a value obtained by converting the signal Sb based on reset cancelation of the FD 13b from the analog signal to the digital signal.

At time t14, the comparison signal Vra becomes the end level Ven, and the pixel control circuit 120 then resets the comparison signal Vra to the start level Vst, and stops supplying the clock signal CLK. Then, the output signal Vco returns to the low level.

At time t15, the readout control circuit 220 sets the control pulse CNTe to the low level. When the control pulse CNTe becomes the low level, the counter circuit 212 outputs the count value CNTv to the CDS circuit 213, and then resets the count value CNTv. The CDS circuit 213 holds the count value CNTv output from the counter circuit 212 as a digital value Dbn of the N signal.

At time t16, the pixel control circuit 120 sets the transfer pulse PTXb to the high level. Then, the transfer switch 12b transfers the charge converted by the PD 11b, to the FD 13b. Then, the pixel control circuit 120 sets the transfer pulse PTXb to the low level, and the transfer switch 12b ends transfer of the charge. The FD 13b holds the signal Sb that is based on the photoelectric conversion of the PD 11b.

At times t17 to t19, the pixel control circuit 120 reduces the comparison signal Vra from the start level Vst to the end level Ves at constant speed. Further, at time t17, the readout control circuit 220 sets the control pulse CNTe to the high level, and starts supplying the clock signal CLK. When the control pulse CNTe becomes the high level, the counter circuit 212 starts counting the count value CNTv based on the clock signal CLK.

At time t18, the comparison signal Vra becomes smaller than the signal Sb, and the comparison unit 20 then outputs the high-level output signal Vout (FIG. 1). The logic control circuit 30 normally amplifies the high-level output signal Vout by the inverters 31 and 32, and outputs the high-level output signal Vco. When the output signal Vco becomes the high level, the counter circuit 212 ends the counting operation of the count value CNTv. The count value CNTv is a value obtained by converting the signal Sb that is based on the photoelectric conversion of the PD 11b from the analog signal to the digital signal.

At time t19, the comparison signal Vra becomes the end level Ves, and the pixel control circuit 120 then resets the comparison signal Vra to the start level Vst, and stops supplying the clock signal CLK. Then, the output signal Vco returns to the low level.

At time t20, the readout control circuit 220 sets the control pulse CNTe to the low level. When the control pulse CNTe becomes the low level, the counter circuit 212 outputs the count value CNTv to the CDS circuit 213, and then resets the count value CNTv. The CDS circuit 213 holds the count value CNTv output from the counter circuit 212 as a digital value Dbs of the S signal. Further, the CDS circuit 213 outputs a difference between the digital value Dbs of the S signal and the digital value Dbn of the N signal as the pixel signal SIG of the pixel 10b, based on the control signal SEL.

The imaging device 1001 generates the pixel signals SIG of the pixels 10a and 10b in all of the pixel circuits 110 by the processing in FIG. 4. The plurality of readout circuits 210 operates in parallel to enable high-speed readout.

During a period from time t2 to time t4, the gate of the input transistor 15a receives a signal in a state where the reset switch 14a is turned off after the reset switch 14a supplies the comparison signal Vra of the reset level Vres to the gate of the input transistor 15a. During a period from time t2 to time t4, the comparison unit 20 compares the signal Sa input to the gate of the input transistor 15a with the comparison signal Vrb varying with time.

During a period from time t7 to time t9, the comparison unit 20 compares the signal Sa that is based on the charge converted by the PD 11a with the comparison signal Vrb varying with time.

During a period from time t12 to time t14, the gate of the input transistor 15b receives a signal in a state where the reset switch 14b is turned off after the reset switch 14b supplies the comparison signal Vrb of the reset level Vres to the gate of the input transistor 15b. During a period from time t12 to time t14, the comparison unit 20 compares the signal Sb input to the gate of the input transistor 15b with the comparison signal Vra varying with time.

During a period from time t17 to time t19, the comparison unit 20 compares the comparison signal Vra varying with time with the signal Sb that is based on the charge converted by the PD 11b.

Figure 5:
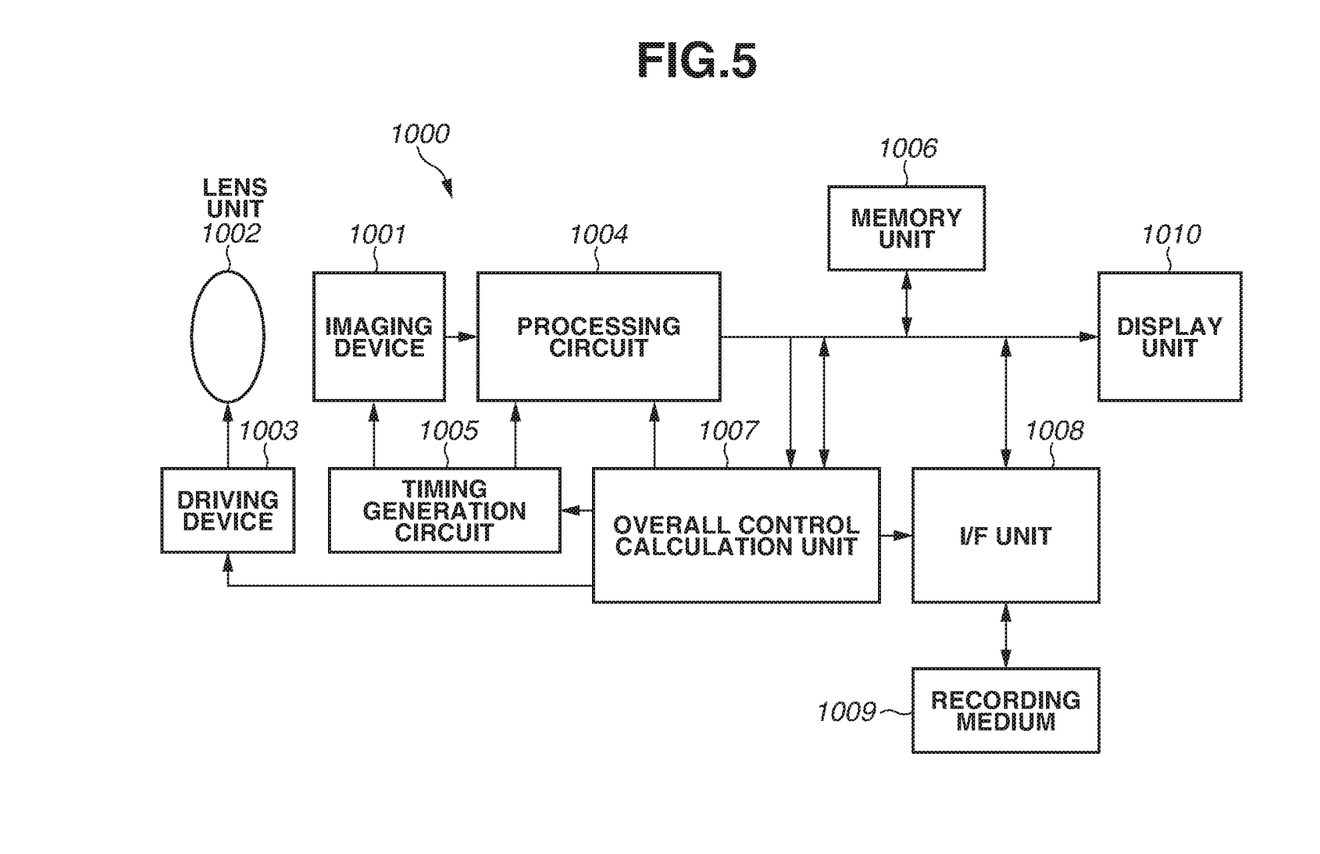
FIG. 5 is a block diagram illustrating a configuration example of an imaging system.

FIG. 5 is a block diagram illustrating a configuration example of an imaging system 1000. The imaging system 1000 includes, in addition to the imaging device 1001 in FIG. 3, a lens unit 1002, a driving device 1003, a processing circuit 1004, a timing generation circuit 1005, a memory unit 1006, and an overall control calculation unit 1007. The imaging system 1000 further includes an interface unit 1008, a recording medium 1009, and a display unit 1010.

The lens unit 1002 forms an optical image of an object on the imaging device 1001. The driving device 1003 performs zoom control, focus control, diaphragm control, on the lens unit 1002. The imaging device 1001 includes the configuration illustrated in FIG. 3, and outputs the pixel signals SIG of the plurality of pixels 10a and 10b arranged in a two-dimensional matrix, to the processing circuit 1004.

The processing circuit 1004 performs correction, data compression, and the like on the pixel signals SIG output from the imaging device 1001, thereby generating image data. The timing generation circuit 1005 outputs an imaging mode instruction signal and various kinds of timing signals to the imaging device 1001 and the processing circuit 1004.

The memory unit 1006 temporarily stores the image data. The overall control calculation unit 1007 performs various kinds of calculation, and controls the entire imaging system 1000. The interface unit 1008 records or reads out the image data to or from the recording medium 1009. The recording medium 1009 is an attachable/detachable semiconductor memory storing the image data. The display unit 1010 displays various kinds of information and an image.

Next, operation of the imaging system 1000 in imaging is described. When a main power supply of the imaging system 1000 is turned on, the overall control calculation unit 1007 is turned on, and the processing circuit 1004 and other components are further turned on.

When a release button of the imaging system 1000 is pressed, imaging operation is started. The timing generation circuit 1005 instructs the imaging device 1001 to perform imaging. In the imaging device 1001, the areas of the PDs 11a and 11b can be increased in the first substrate 100 that receives the optical image, and imaging with high image quality can be performed through improvement of light condensing performance or increase of the number of pixels. Further, since the plurality of pixel circuits 110 does not share the readout circuit 210, the readout speed can be accelerated and frame rate can be increased.

The imaging device 1001 outputs the pixel signals SIG of all of the pixels 10a and 10b to the processing circuit 1004 by the processing illustrated in FIG. 4. The processing circuit 1004 performs image processing on the pixel signals SIG. The overall control calculation unit 1007 writes the image data processed by the processing circuit 1004, in the memory unit 1006.

Next, the overall control calculation unit 1007 reads out the image data stored in the memory unit 1006, and records the readout image data in the recording medium 1009 through the interface unit 1008. The overall control calculation unit 1007 may output the image data to a computer or the like (not illustrated), and cause the computer or the like to perform processing of the image.

As described above, the imaging system 1000 can record the image with high image quality at a high frame rate by using the imaging device 1001.

A second exemplary embodiment of the disclosure is described with reference to FIG. 6 and FIG. 7. The pixels 10a and 10b arranged in a matrix include RGB color filters of Bayer array. The PD 11a or 11b provided with a green (G) color filter is higher in sensitivity than the PD 11a or 11b provided with a red (R) color filter or a blue (B) color filter. In the present exemplary embodiment, a method of reading out the signal at speed higher than the first exemplary embodiment in a case where sensitivity varies depending on the PD 11a or 11b is described. Difference of the second exemplary embodiment from the first exemplary embodiment is described below.

Figure 6:
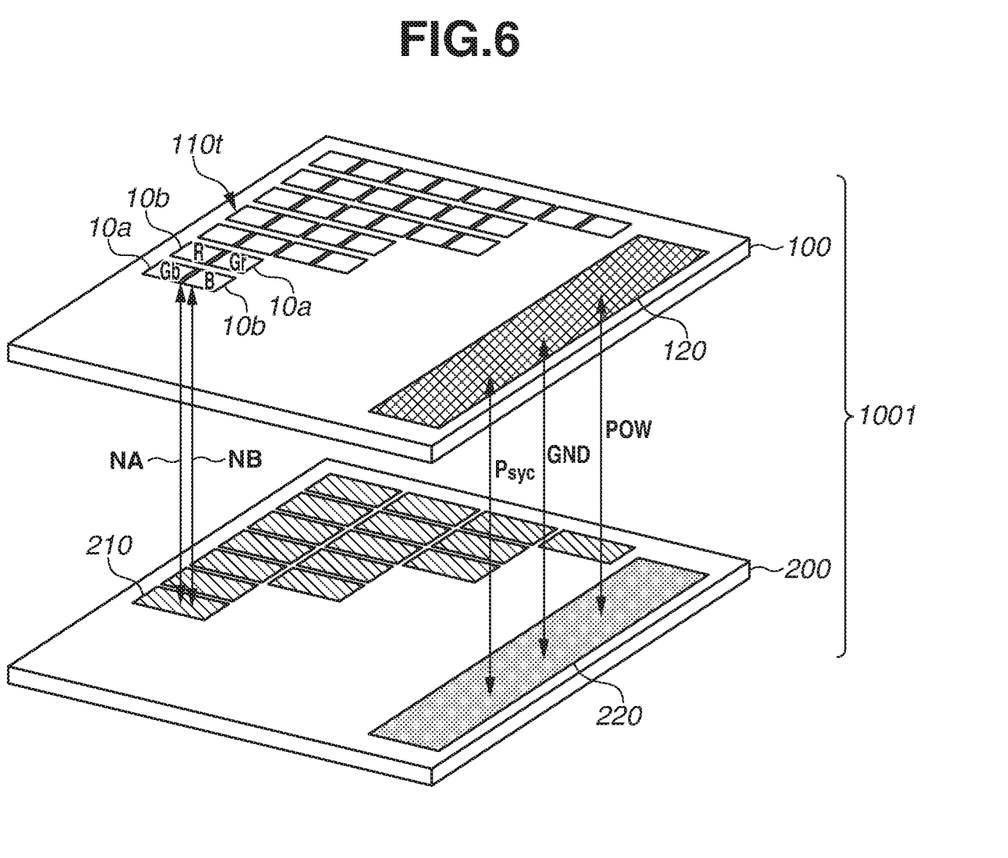
FIG. 6 is a perspective view illustrating a structure example of an imaging device.

FIG. 6 is a perspective view illustrating a structure example of the imaging device 1001 according to the second exemplary embodiment of the disclosure. The imaging device 1001 in FIG. 6 is illustrated with colors of the color filters provided to the pixels 10a and 10b in addition to the imaging device 1001 in FIG. 3.

In the first substrate 100 of the imaging device 1001, the color filters of the Bayer array are provided to the pixels 10a and 10b arranged in a matrix. Each of the plurality of pixel circuits 110t includes the pixels 10a and 10b. For example, in odd rows, the pixels 10b each provided with the R color filter and the pixels 10a each provided with the Gr color filter are alternately arranged. In even rows, the pixels 10a each provided with the Gb color filter and the pixels 10b each provided with the B color filter are alternately arranged.

Each of the pixel circuits 110t in the odd rows includes the pixel 10b provided with the R color filter and the pixel 10a provided with the Gr color filter. Each of the pixel circuits 110t in the even rows includes the pixel 10a provided with the Gb color filter and the pixel 10b provided with the B color filter. The pixel 10a is provided with the Gr or Gb color filter, and sensitivity of the PD 11a is high. The pixel 10b is provided with the R or B color filter, and sensitivity of the PD 11b is low.

A part of the pixel circuits 110t may include the pixel 10b provided with the R color filter and the pixel 10a provided with the Gb color filter. The other pixel circuits 110t each may include the pixel 10a provided with the Gr color filter and the pixel 10b provided with the B color filter.

Figure 7:
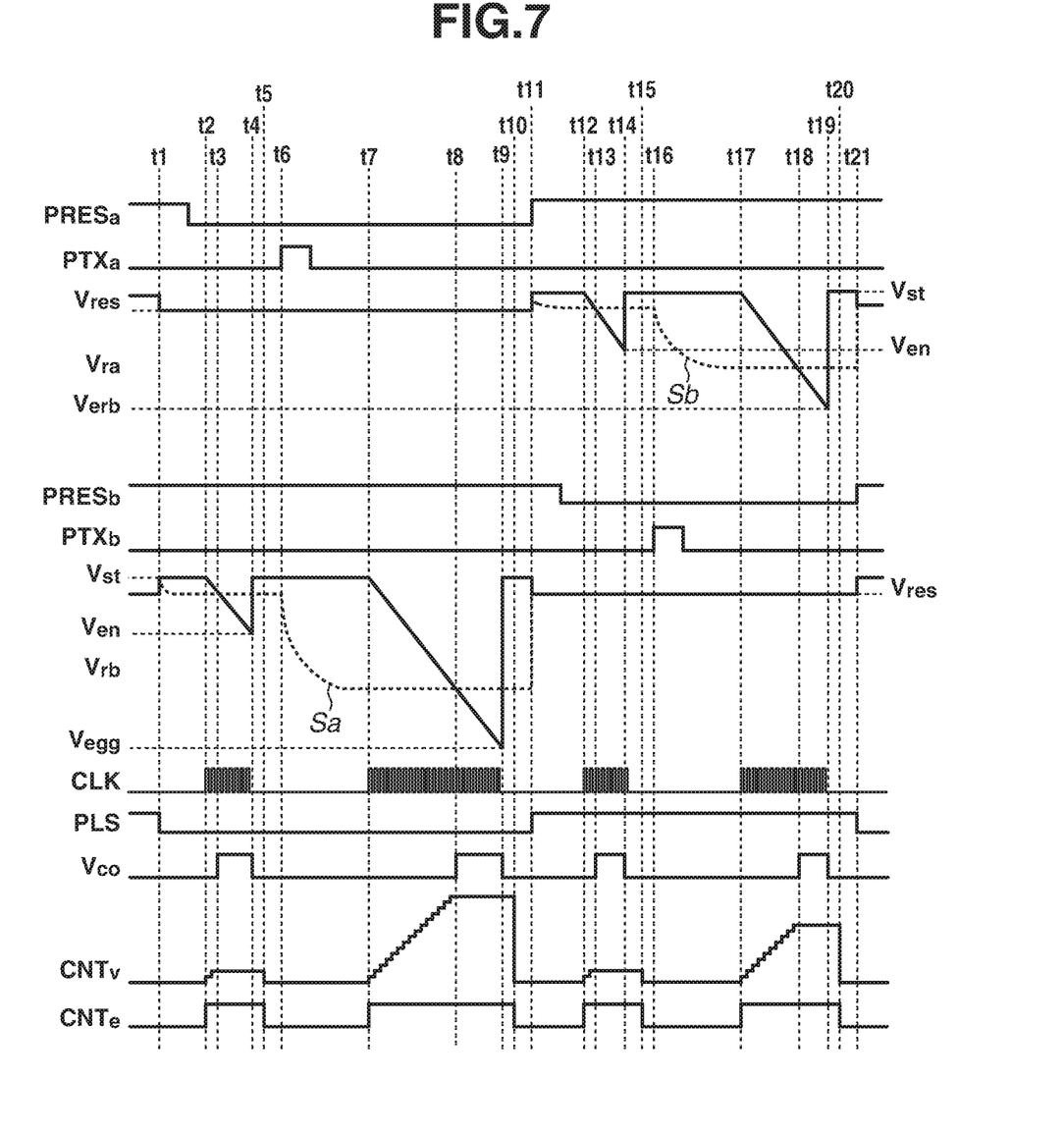
FIG. 7 is a timing chart illustrating a readout operation.

FIG. 7 is a timing chart illustrating a method of controlling the imaging device 1001 according to the second exemplary embodiment. In the timing chart in FIG. 7, an end level Verb of the comparison signal Vra is provided in place of the end level Ves of the comparison signal Vra, and an end level Vegg of the comparison signal Vrb is provided in place of the end level Ves of the comparison signal Vrb as compared with the timing chart in FIG. 4. Difference of FIG. 7 from FIG. 4 is described below.

At times t7 to t9, the pixel control circuit 120 reduces the comparison signal Vrb from the start level Vst to the end level Vegg at constant speed.

At times t17 to t19, the pixel control circuit 120 reduces the comparison signal Vra from the start level Vst to the end level Verb at constant speed.

In the pixel 10a, the Gr or Gb color filter is provided, and sensitivity of the PD 11a is high. Thus, it is necessary to widen a dynamic range of the signal Sa of the pixel 10a. In contrast, in the pixel 10b, the R or B color filter is provided, and sensitivity of the PD 11b is low. Therefore, a dynamic range of the signal Sb of the pixel 10b may be narrow.

The end level Verb is larger than the end level Vegg. An absolute value of a variation value of the comparison signal Vra at times t17 to t19 is smaller than an absolute value of a variation value of the comparison signal Vrb at times t7 to t9. Accordingly, the period from time t17 to time t19 is shorter than the period from time t7 to time t9, which makes it possible to shorten the signal readout time of the pixel.

As described above, in a case where the sensitivity of the PD 11a and the sensitivity of the PD 11b are different from each other, the pixel circuit 110 includes the pixel 10a with high sensitivity and the pixel 10b with low sensitivity, which makes it possible to improve the readout speed.

In FIG. 7, the order in which the signal of the pixel 10*a* with high sensitivity is first read out, and the signal of the pixel 10*b* with low sensitivity is then read out has been described. However, the order may be changed, and the signal of the pixel 10*b* with low sensitivity may be first read out and the signal of the pixel 10*a* with high sensitivity may be then read out.

The imaging device 1001 is applicable to, in addition to a digital camera and a video camera, a smartphone, a tablet terminal, an industrial camera, a medical camera, a car-mounted camera, etc.

Although the exemplary embodiments of the disclosure have been described above, the disclosure is not limited to these exemplary embodiments, and the disclosure can be variously modified or altered within the scope of the gist of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-094671, filed May 20, 2019, which is hereby incorporated by reference herein in its entirety.

What is claimed is:

1. An imaging apparatus comprising:
    first and second photoelectric conversion circuits configured to convert light into first and second charges, respectively;
    a comparison circuit having first and second transistors which receive respectively first and second signals;
    a first switch configured to supply the first signal to the first transistor;
    a second switch configured to supply a first comparison signal varying with time to the first transistor;
    a third switch configured to supply the second signal to the second transistor;
    a fourth switch configured to supply a second comparison signal varying with time to the second transistor; and
    a logic control circuit configured to output an inverted signal of the output signal of the comparison circuit to a counter during a first period and a second period, and to output a non-inverted signal of the output signal of the comparison circuit to the counter during a third period and a fourth period,
    wherein the first and second signals are based on the first and second charges or the first and second comparison signals, respectively, and
    wherein the comparison circuit
        compares the first signal input to the first transistor with the second comparison signal in a state where the second switch is turned off after the second switch supplies the first comparison signal of a reset level to the first transistor, during the first period,
        compares the first signal with the second comparison signal varying with time, during the second period,
        compares the second signal input to the second transistor with the first comparison signal in a state where the fourth switch is turned off after the fourth switch supplies the second comparison signal of a reset level to the second transistor, during the third period,
        and compares the second signal with the first comparison signal, during the fourth period.

2. The imaging apparatus according to claim 1, further comprising a difference output circuit configured to output a difference between a count value of the counter during the first period and a count value of the counter during the second period, and to output a difference between a count value of the counter during the third period and a count value of the counter during the fourth period.

3. The imaging apparatus according to claim 1,
    wherein the first photoelectric conversion circuit is provided with a green color filter, and
    wherein the second photoelectric conversion circuit is provided with a red or blue color filter.

4. The imaging apparatus according to claim 3, wherein an absolute value of a variation value of the first comparison signal varying with time is smaller than an absolute value of a variation value of the second comparison signal varying with time.

5. The imaging apparatus according to claim 1,
    wherein the comparison circuit further includes a third transistor,
    wherein the imaging apparatus includes a first substrate and a second substrate,
    wherein the first substrate is provided with the first photoelectric conversion circuit, the second photoelectric conversion circuit, the first transistor, and the second transistor, and
    wherein the second substrate is provided with the third transistor.

6. The imaging apparatus according to claim 1, further comprising a counter configured to perform counting based on an output signal of the comparison circuit.

* * * * *